(12) United States Patent
Molyneux et al.

(10) Patent No.: US 10,883,294 B2
(45) Date of Patent: Jan. 5, 2021

(54) ADJUSTABLE HINGE ASSEMBLY

(71) Applicant: BENTLEY MOTORS LIMITED, Crewe (GB)

(72) Inventors: David Molyneux, Shavington (GB); Steve Crowe, Sandbach (GB); Gary David Green, Crewe (GB); Matthew Robinson, Wigland (GB); Paul Wentworth, Leek (GB); Thirupathi Adla, Crewe (GB)

(73) Assignee: Bentley Motors Limited, Crewe (GB)

( * ) Notice: Subject to any disclaimer, the term of this patent is extended or adjusted under 35 U.S.C. 154(b) by 134 days.

(21) Appl. No.: 16/307,915

(22) PCT Filed: Apr. 26, 2017

(86) PCT No.: PCT/GB2017/051159
§ 371 (c)(1),
(2) Date: Dec. 6, 2018

(87) PCT Pub. No.: WO2017/212213
PCT Pub. Date: Dec. 14, 2017

(65) Prior Publication Data
US 2019/0309550 A1     Oct. 10, 2019

(30) Foreign Application Priority Data

Jun. 7, 2016 (GB) .................................. 1609901.2

(51) Int. Cl.
*E05D 5/06* (2006.01)
*B62D 25/10* (2006.01)
(Continued)

(52) U.S. Cl.
CPC ........... *E05D 5/062* (2013.01); *B62D 25/105* (2013.01); *B62D 25/12* (2013.01); *E05D 3/022* (2013.01);
(Continued)

(58) Field of Classification Search
CPC ....... E05D 5/062; E05D 3/022; E05D 7/0423; E05D 2005/067; E05D 2007/0461; B62D 25/105; B62D 25/12; E05Y 2900/548
(Continued)

(56) References Cited

U.S. PATENT DOCUMENTS

| 4,893,863 | A | * | 1/1990 | Skonieczny | .......... E05D 7/0045 16/235 |
| 5,029,930 | A | * | 7/1991 | Ihrke | ..................... E05D 5/0207 16/235 |

(Continued)

FOREIGN PATENT DOCUMENTS

| CN | 101148963 A | 3/2008 |
| CN | 203441240 U | 2/2014 |

(Continued)

OTHER PUBLICATIONS

PCT/GB2017/051159; International Preliminary Report on Patentability; dated Dec. 20, 2018.
(Continued)

*Primary Examiner* — Jason S Morrow
(74) *Attorney, Agent, or Firm* — Schwabe Williamson & Wyatt, P.C.

(57) ABSTRACT

An adjustable hinge assembly (10) for securing a boot lid to the body of a vehicle has a mounting member (22) for attachment to the body. An adjustment member (24) is connected to the mounting member for pivotal movement about a first axis X and a hinge arm (18) on which the boot lid is mounted is connected to the adjustment member for pivotal movement about a second axis Y parallel to but spaced from the first axis. An adjusting mechanism (26) is operative to selectively adjust the pivotal position of the adjustment member (24) relative to the mounting member
(Continued)

(22) in order to adjust the position of the boot lid relative to a body in a vertical direction.

19 Claims, 4 Drawing Sheets

(51) Int. Cl.
    *B62D 25/12*     (2006.01)
    *E05D 3/02*     (2006.01)
    *E05D 7/04*     (2006.01)

(52) U.S. Cl.
    CPC ...... *E05D 7/0423* (2013.01); *E05D 2005/067* (2013.01); *E05D 2007/0461* (2013.01); *E05Y 2900/548* (2013.01)

(58) Field of Classification Search
    USPC .......................................................... 296/76
    See application file for complete search history.

(56) References Cited

U.S. PATENT DOCUMENTS

| | | | | |
|---|---|---|---|---|
| 5,074,609 A | * | 12/1991 | Dear | E05D 7/0045 16/235 |
| 5,873,619 A | * | 2/1999 | Lewkoski | E05D 7/0423 16/241 |
| 5,967,586 A | * | 10/1999 | Duffy | E05D 7/0045 16/235 |
| 8,720,007 B2 | * | 5/2014 | Krajenke | E05D 7/0423 16/240 |
| 2008/0018131 A1 | * | 1/2008 | Heath | E05F 1/1033 296/76 |
| 2008/0072399 A1 | | 3/2008 | Krajenke et al. | |
| 2013/0111703 A1 | * | 5/2013 | Duffy | E05D 3/02 16/221 |
| 2015/0252602 A1 | * | 9/2015 | Nielsen | E05D 11/04 16/275 |

FOREIGN PATENT DOCUMENTS

| | | |
|---|---|---|
| CN | 105604421 | 5/2016 |
| DE | 19731767 A1 | 3/1998 |
| DE | 102007002660 A1 | 7/2008 |
| DE | 102008056430 B3 | 2/2010 |
| WO | WO2011140029 A1 | 11/2011 |

OTHER PUBLICATIONS

Chinese Patent Application No. 201780032223.8; Office Action; dated Nov. 4, 2019.

Chinese Patent Application No. 201780032223.8; Office Action; dated May 15, 2020.

\* cited by examiner

ADJUSTABLE HINGE ASSEMBLY

CROSS-REFERENCE TO RELATED APPLICATIONS

This application is a 371 U.S. National Stage of International Application No. PCT/GB2017/051159, filed Apr. 26, 2017, entitled "ADJUSTABLE HINGE ASSEMBLY," which designated, among the various States, the United States of America, and which claims priority to GB 1609901.2, filed Jun. 7, 2016, both of which are hereby incorporated by reference.

TECHNICAL FIELD OF THE INVENTION

The present invention relates to an adjustable hinge assembly. The invention also relates to a motor vehicle having a body and a closure mounted to the body by means of at least one such adjustable hinge assembly.

BACKGROUND TO THE INVENTION

It is known to mount a closure to a vehicle body by means of a hinge which allows for adjustment of the position of the closure relative to the vehicle body. This allows for the gap between the outer surface of the closure and the outer surfaces of adjacent body panels to be controlled. Such adjustable hinge assemblies are often used for mounting a boot or bonnet lid to a vehicle body. However, the known adjustable hinge arrangements are often difficult to access once the closure is fitted, making adjustment complicated. Furthermore, in the prior art arrangements, external forces on the hinge, e.g. the closure weight and motor forces etc., cause the hinge to move when the fixings are slackened to allow for adjustment. This causes the starting position of the hinge to be lost when adjusting the hinge. A further drawback of the known adjustable hinge assemblies is that they often do not provide for reliable and repeatable adjustment of a closure in the vertical direction.

There is a need therefore for an alternative adjustable hinge assembly which overcomes or at least mitigates the some or all of the problems of the known assemblies.

There is also a need for a vehicle having body and a closure mounted to the body by means of an alternative adjustable hinge assembly which overcomes or at least mitigates the some or all of the problems of the known vehicles.

SUMMARY OF THE INVENTION

According to a first aspect of the invention, there is provided an adjustable hinge assembly comprising a mounting unit including a mounting member, an adjustment member connected to the mounting member for pivotal movement relative to the mounting member about a first axis, and an adjusting mechanism operative to selectively adjust the pivotal position of the adjustment member relative to the mounting member about the first axis, the assembly also including a hinge arm connected to the adjustment member for pivotal movement relative to the adjustment member about a second axis parallel to but spaced from the first axis and a locking mechanism for releasably locking the adjustment member relative to the mounting assembly.

The locking mechanism may be separate from the adjusting mechanism.

In an embodiment, the mounting member comprises a pair of spaced opposed first side walls, the adjustment member being located between the first side walls and having a pair of spaced opposed second side walls, the hinge arm having pivot section received between the second side walls, the hinge arm being connected to the adjustment member by means of a hinge arm pivot pin which passes through a bore in the pivot section of the hinge arm and aligned apertures in the second side walls. The hinge arm pivot pin may also pass through an elongate opening in each of the first side walls. The elongate openings may be configured to be aligned vertically when the hinge is in use. The locking mechanism may comprise means associated with the hinge arm pivot pin operative to selectively clamp each first side wall into contact with an adjacent second side wall and to clamp the second side walls to the pivot section of the hinge arm. The hinge arm pin may comprise a threaded bolt, a threaded fastener being mounted to one end of the bolt.

In an embodiment, the pivot section of the hinge arm comprises a pivot bearing located in a bore in the hinge arm, the bearing defining a central bore through which the pivot pin passes. The bearing may have an annular main body region and a flange projecting radially outward from the outer diameter of the main body at either end, each flange overlying a respective side face of the hinge arm. In which case, the locking mechanism may be operative to clamp the second side walls into contact with the flanges of the pivot bearing.

In an embodiment, the adjustment member is pivotally connected to the mounting member by means of an adjustment pivot pin which passes through aligned holes in the first side walls and through the adjustment member. The adjustment pivot pin may pass through aligned holes in the second side walls of the adjustment member.

In an embodiment, the adjusting mechanism comprises a nut captivity mounted to one of the adjustment member and the mounting member and a threaded bolt rotatably mounted to the other of the adjustment member and the mounting member, the bolt being in threaded engagement with the nut such that rotation of the bolt causes the nut to move axially along the length of the bolt and the adjusting mechanism to pivot relative to the mounting member about the first axis. The nut may comprise a cylindrical member having a threaded bore extending through it in a direction perpendicular to its longitudinal axis, the cylindrical member being mounted to the adjustment member for rotation about its longitudinal axis, which longitudinal axis is aligned parallel to but spaced from the first and second axes.

The mounting member may have at least one mounting flange for securing the mounting member to a surface. At least one mounting flange may extend in a plane generally perpendicular to the first side walls. Pivotal movement of the adjustment member about the first axis may be operative to vary the distance between the second axis and the at least one mounting flange. The hinge assembly may be configured such that the adjusting member is accessible to adjust the hinge from the same side of the surface to which the mounting member is to be mounted.

The hinge assembly may be configured to mount a vehicle boot lid to the body of a vehicle. The hinge assembly may be configured so that the mounting member is mounted to a panel of the vehicle in use and so that with the hinge assembly mounted to the panel, the adjustment member is accessible to adjust the hinge from the same side of the panel as the mounting member is attached.

In accordance with a second aspect of the invention, there is provided a mounting unit for an adjustable hinge assembly in accordance with the first aspect, the mounting unit comprising a mounting member, an adjustment member connected to the mounting member for pivotal movement relative to the mounting member about a first axis, and an adjusting mechanism operative to selectively adjust the pivotal position of the adjustment member relative to the mounting member about the first axis the, mounting unit further comprising an arrangement for mounting a hinge arm to the adjustment member for pivotal movement relative to the adjustment member about a second axis parallel to but spaced from the first axis.

In accordance with a third aspect of the invention, there is provided a motor vehicle having a body and a lid mounted to the body by means of at least one adjustable hinge assembly in accordance with the first aspect. The lid may be a boot lid. The body may have a parcel shelf and the lid may be mounted to the parcel shelf by means of said at least one adjustable hinge assembly. The mounting member may be mounted to a lower surface of the parcel shelf. The adjusting mechanism may be accessible from the below the parcel shelf. The arrangement may be configured such that adjustment of the at least one hinge assembly results in adjustment of the lid generally in a vertical direction relative to the vehicle body.

DETAILED DESCRIPTION OF THE INVENTION

In order that the invention may be more clearly understood an embodiments thereof will now be described, by way of example only, with reference to the accompanying drawings, of which:

A first embodiment of an adjustable hinge assembly 10 in accordance with an aspect of the invention will now be described with reference to FIGS. 1 to 3.

In the following description and claims, relative terms such as "upper" and "lower", "forward" and "rearward" and the like used in relation to features of the hinge assembly refer to the relative position of the respective feature when the hinge assembly 10 is mounted to a motor vehicle, the vehicle being in a usual upright position on a horizontal surface. The terms "forward" and "rearward" and the like will be understood as referring to directions which correspond to the front and rear respectively of a vehicle to which the hinge assembly is fitted in use.

Figure 1:
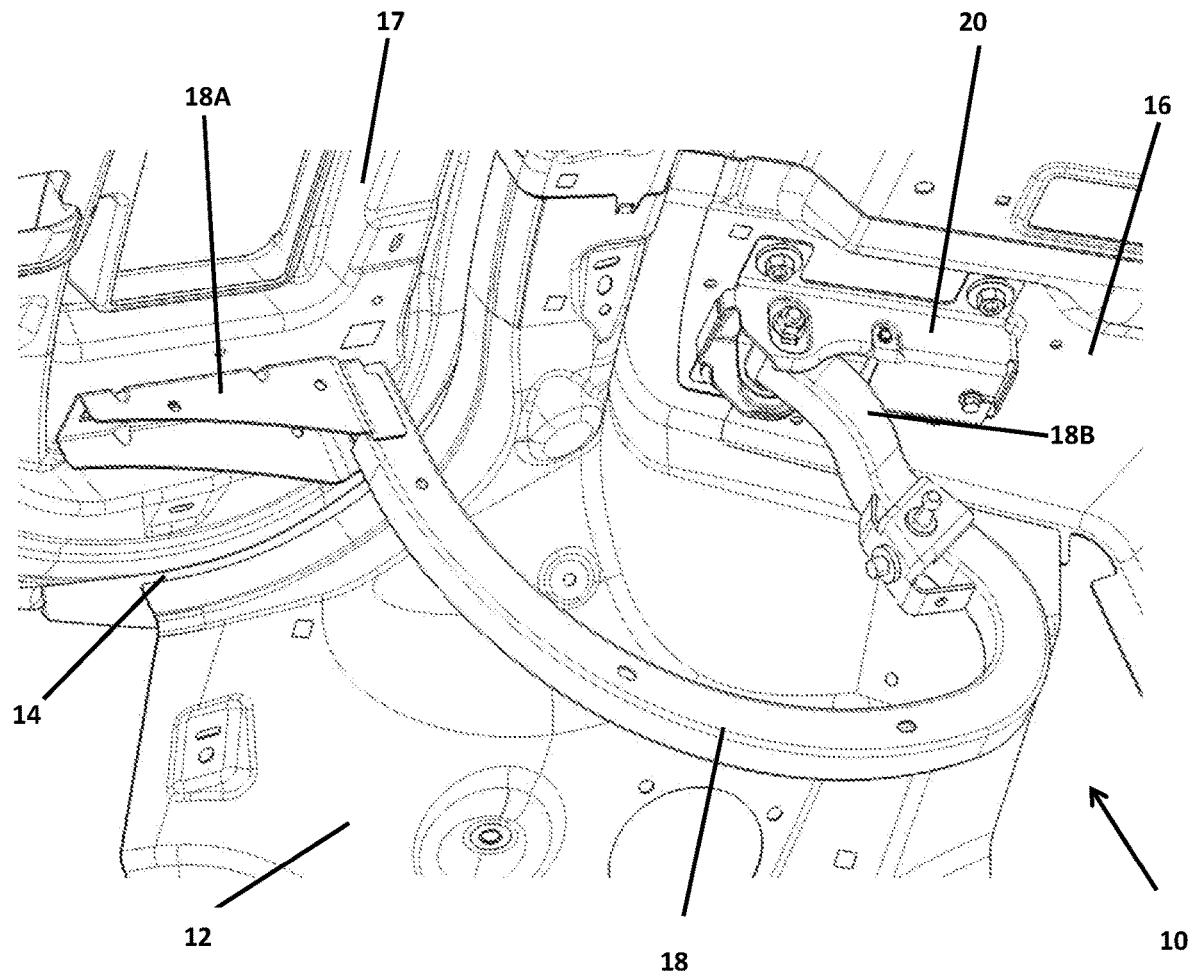
FIG. 1 is a perspective view of part of a vehicle body showing a first embodiment of an adjustable hinge assembly attached to a parcel shelf of the body for mounting a boot lid to the body.

FIG. 1 shows part of a body 12 of a motor vehicle in the form of a saloon type car. The body has a boot opening 14 at the rear. A parcel shelf 16 is located along a forward edge 14A of the boot opening, behind a passenger compartment of the body in a conventional manner. In the assembled vehicle, the boot opening 14 is closed by a boot lid 17. In a known manner, the boot lid 14 is mounted to the parcel shelf 16 of the vehicle body 12 by means of a pair of hinge assemblies 10 spaced apart, one either side, so that the boot lid can be moved between closed and opened positions relative to the vehicle body. FIG. 1 shows a hinge assembly 10 on one side, the other hinge assembly having a similar construction. Each hinge assembly 10 includes a hinge arm 18 and a mounting unit 20. The hinge arm 18 is attached at a first end 18A to an inner surface of the boot lid and pivotally attached at a second end 18B to the mounting unit 20, which is secured to the parcel shelf 16 from below.

Figure 2:
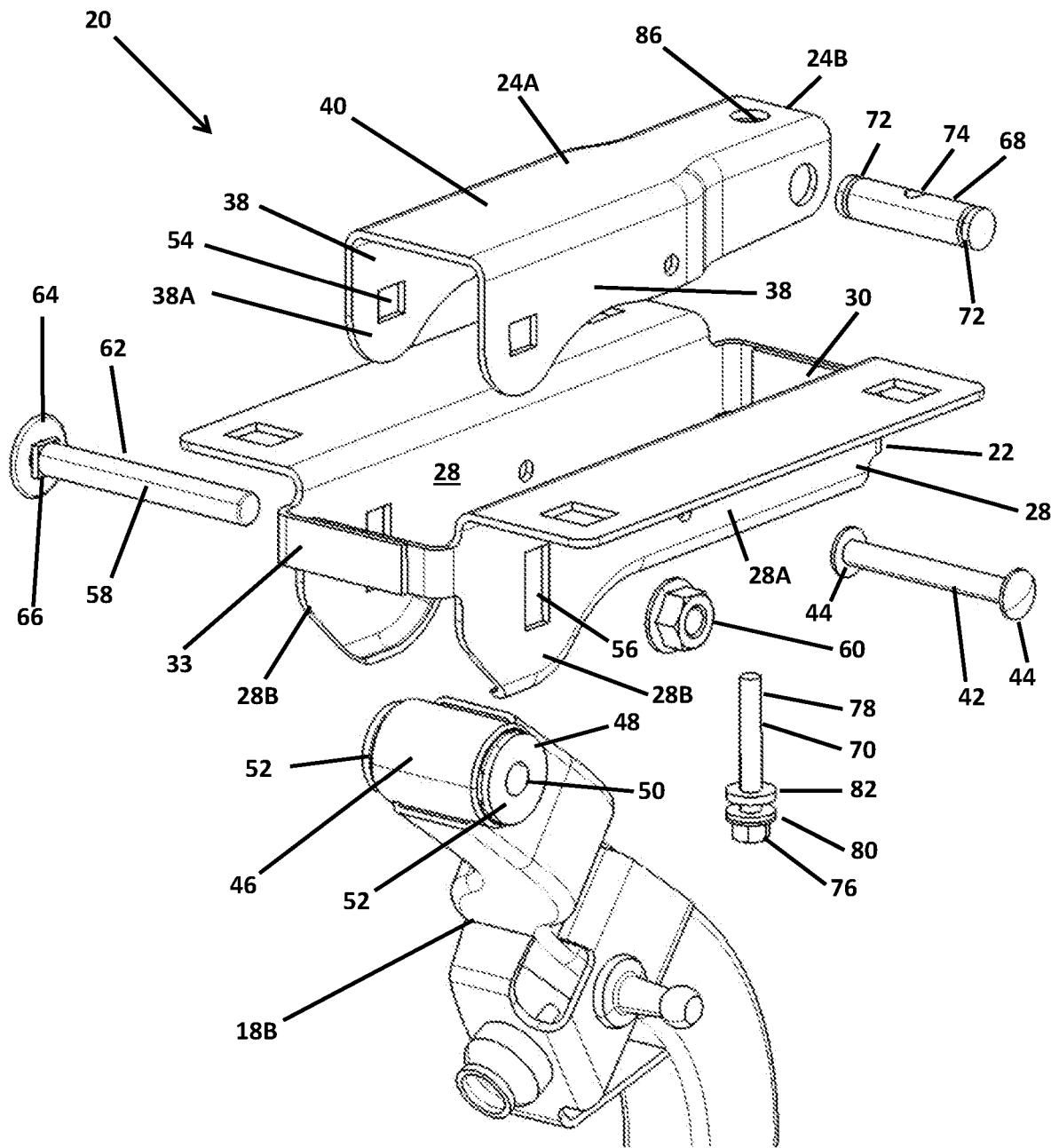
FIG. 2 is a perspective, exploded view of part of the hinge assembly in FIG. 1.
Figure 3:
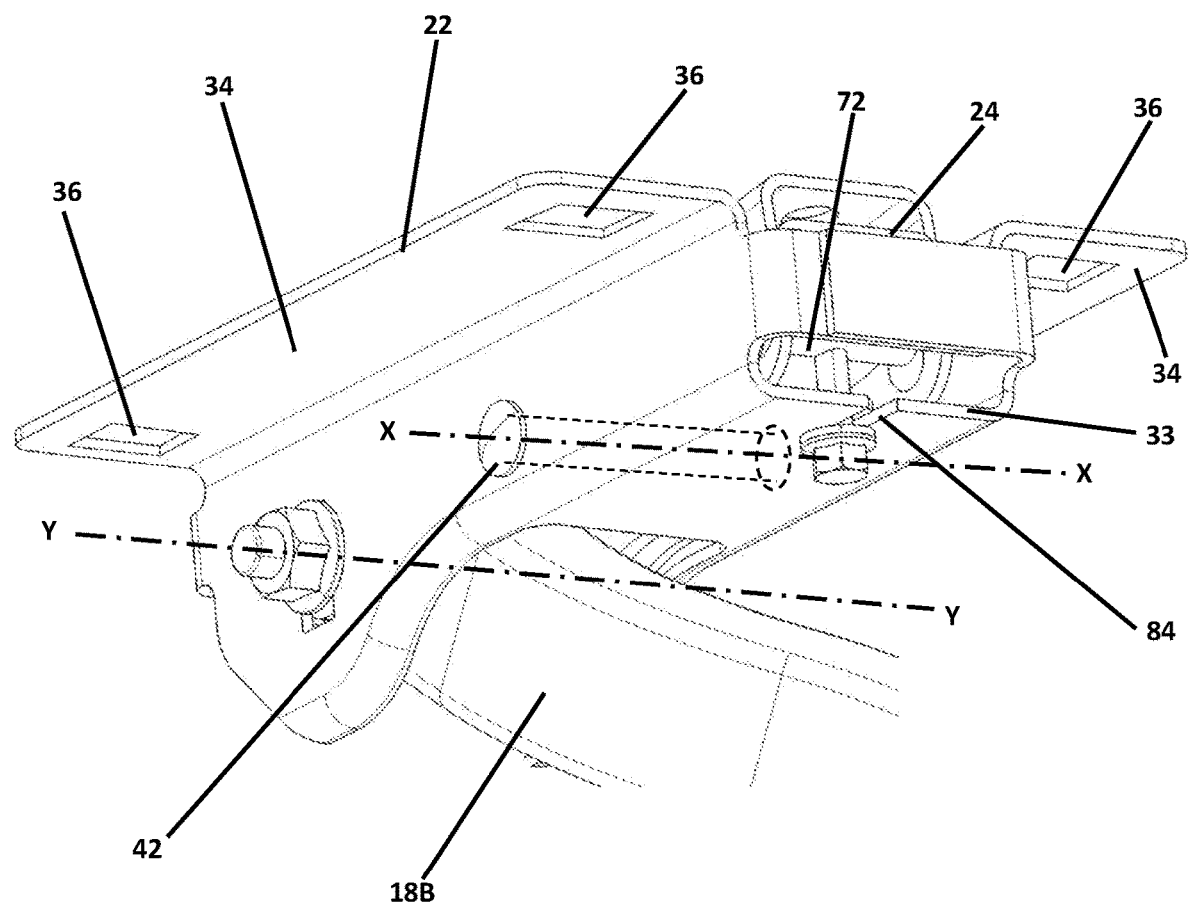
FIG. 3 is an alternative perspective view of part of the hinge assembly in FIG. 1, with parts of the hinge assembly shown ghosted.

Details of the mounting unit 20 and the second end 18B of the hinge arm 18 can be seen more clearly in FIGS. 2 and 3. The mounting unit 20 includes a mounting member 22 and an adjustment member 24. The mounting member 22 is configured to be secured to the parcel shelf 16. The adjustment member 24 is located within and pivotally connected to the mounting member 22 for pivotal movement relative to the mounting member 22 about a first axis X. The second end 18B of the hinge arm is mounted to the adjustment member 24 so that the hinge arm 18 pivots relative to the adjustment member about a second axis Y. The second axis Y being spaced from but parallel to the first axis X. Both the first X and second Y axes extend generally in a transverse direction of the vehicle. An adjusting mechanism, indicated generally at 26, is operative between the mounting member 22 and the adjustment member 24 to selectively vary the pivotal position of the adjustment member 24 relative to the mounting member 22 about the first axis. This allows the vertical distance between the second axis Y and the parcel shelf 16 to be adjusted, which in turn allows adjustment of the position of the boot lid relative to the vehicle body 12 in a vertical direction.

The mounting member 22 is in the form of a cage for receiving the adjustment member 24 and can be made from any suitable material capable of supporting the required loads, such as a metallic or composite material. The mounting member 22 has a pair of opposed first side walls 28 which extend parallel to one another in spaced relation. When the hinge assembly 10 is mounted to a vehicle, the first side walls depend downwardly from the parcel shelf and extend generally in a lengthways direction of the vehicle from front to rear. The first side walls 28 are substantially mirror images of each other, each having a forward region 28A of substantially constant depth and a rearward region 28B of increased depth. The first side walls 28 are interconnected at a forward end by a first transverse vertical wall member 30 and at a rearward end by a second transverse vertical wall member 32 and by means of a horizontal lower wall 33 in the forward region. Inwardly directed flanges are provided along the lower ends of the side walls for added structural rigidity.

At the upper edge of each first side wall 28 is a mounting flange 34 which extends laterally outwardly generally in a direction perpendicular to the plane of the first side wall 28 for contact with a mounting region of the under surface of the parcel shelf 16. Each flange 34 has a pair of spaced apertures 36 through which fasteners are inserted to attach the mounting member to the parcel shelf. It will be appreciated that the shape of the flanges 34 can be modified to conform to the surface on which they are mounted. It will also be appreciated that other arrangements can be adopted for attaching the mounting member 22 to the parcel shelf 16 or other part of the vehicle body.

The adjustment member 24 is in the form of an inverted U-shaped channel member having a pair of spaced, opposed second side walls 38 interconnected at their upper edges by an upper wall or plate 40. The upper wall 40 extends in a plane generally perpendicular to the second side walls 38. The second side walls 28 extend generally in parallel opposed relation to the first side walls 28 although the width of the adjustment member varies along its length, having a wider rearward section 24A and a narrower forward section 24B. In the rearward section 24A, the second side walls 38 are spaced apart such that they are a close sliding fit between the first side walls 28 of the mounting member 22, at least when the mounting member is in a relaxed state. In the forward section 24B, the second side walls 38 are spaced apart such that there is a gap on either side between the outer surfaces of the second side walls 38 and the inner surfaces of the first side walls 28 of the mounting member 22. The wider rearward section 24A extends from the rear end of the adjustment member for just over half the length of the adjustment member 24. In a manner similar to the first side walls 28, the second side walls have a region 38A of increased depth proximal their rear ends.

The adjustment member 24 is pivotally connected to the mounting member 22 by means of an adjustment pivot pin 42 which extends transversely through aligned openings in the first and second side walls at a position approximately half way along the length of the adjustment member 24, towards a forward end of the wider rearward section 24A. The adjustment pivot pin has head portions 44 at either end which locate adjacent the outer surfaces of the first side walls 28 to hold the adjustment pivot pin in position. The adjustment pivot pin 42 may be made in two parts which are inserted, one from either side, and screwed together.

The second end 18B of the hinge arm 18 is pivotally connected to the adjustment member 24 towards its rear end. The second end 18B of the hinge arm has a pivot bearing 46 comprising a bearing bore extending in a transverse direction through the hinge arm 18 and a bearing bush 48 having a cylindrical, annular main body region received in the bearing bore. The bearing bush 48 has a central axial through bore 50 and an outwardly extending radial flange 52 at either end of the main body. The flanges 52 overlie the sides of the hinge arm 18. The bearing bush 48 may be provided in two parts which are inserted, one from either side.

The second end 18B of the hinge arm is received between the second side walls 38 of adjustment member 24 in the region of increased depth 38A towards the rear end. An aperture 54 is provided in each of the second side walls in the region of increased depth. The apertures 54 are aligned with each other and with the central bore 50 of the bearing bush. Elongate slots 56 are provided in the first side walls 28 of the mounting member 22 which align with the apertures 54 in the second side walls 38 and the central bore 50. The elongate slots 56 extend in the desired direction of adjustment, which in this embodiment is a vertical direction. The second end 18B of the hinge arm is secured to the mounting unit 20 by means of a bolt 58 and nut 60. The bolt 58 has a threaded shaft 62 and a head 64 at one end. The shaft 62 is inserted from one side through the aligned slots 56, apertures 54 and the central bore 50 of the bearing bush and the nut 60 is fastened to the protruding free end of the shaft on the other side. The head 64 and the nut 60 have flanges that extend over the outer surface of their respective first side wall 26 on either side of the elongate slot 52. The bolt 58 has a square sided boss 66 which locates in the slot 56 to constrain the bolt from rotating the nut is tightened.

The nut 60 and bolt 58 can be tightened to lock the adjustment member 24 in position relative to the mounting member 22. When the nut 60 and bolt 58 are tightened, the first side walls 28 are clamped into contact with their respective adjacent second side walls 38 and the second side walls are clamped into contact with the flanges 52 of the bearing bush between the head 64 and the nut 60. However, the hinge arm 18 is able to rotate about the bearing bush 48 as there is sufficient clearance between the flanges 52 of the bearing bush and the sides of the hinge arm 18. The rotational movement of the hinge arm 18 about the bearing bush 40 takes place about the second axis Y, which is coincident with the longitudinal axis of the bolt 58.

When the nut 60 and bolt 58 are loose (i.e. not tightened), the flanges 52 of the bearing bush are a close sliding fit between the second side walls 38 of the adjustment member 24 so that the adjustment member can be rotated about the adjustment pivot pin 42 relative to the mounting member 22 within the first side walls 28. As the adjustment member 24 rotates relative to the mounting member 22, the bolt 58 moves vertically within the elongate slots 56 in the first side walls 28. The apertures 54 in the adjustment member are wider in the horizontal direction so as to allow a small movement of the bolt 58 and the Y axis relative to the adjustment member 24. This allows for linear adjustment in the direction of the slots 56, which are aligned vertically. Rotational movement of the adjustment member 24 takes place about the first axis X, coincident with the longitudinal axis of the adjustment pivot pin 42.

The adjustment mechanism 26 includes an adjustment nut 68 captivity mounted to the adjustment member 24 and a threaded adjustment bolt 70 rotatably mounted to the mounting member 22 and which is in screw threaded engagement with the adjustment nut 68. The adjustment nut 68 is in the form of a cylindrical bar mounted transversely between the second side walls 38 in the narrower forward section 24B of the adjustment member. Ends of the adjustment nut 68 are located in aligned apertures in the second side walls 38 and project into the gaps between the second side walls 38 and the first side walls 28 in this region. The adjustment nut 68 may be secured to the adjustment members by means of a circlip engaging in a groove 72 at either projecting end. The adjustment nut 68 is able to rotate about its longitudinal axis within the apertures. A threaded bore 74 extends through the cylindrical bar 72 in a direction perpendicular to the longitudinal axis at a position generally centrally located between the ends of the bar.

The adjustment bolt 70 has a hexagonal head 76 and a shaft 78, at least part of which is threaded. The head has a first radial flange 80 at its end proximal the shaft and a second radial flange 82 is spaced from the first flange by a short distance along the shaft. The shaft 78 engages in a longitudinal slot 84 formed in the forward end of horizontal lower wall 33 of the mounting member, with the spaced first and second flanges 80, 82 engaging the upper and lower surfaces of the wall either side of the slot. This holds the adjustment bolt 70 longitudinally captive to the mounting member 22 whilst allowing it to rotate. The treaded end of the bolt shaft 78 engages with the threaded bore 74 of the adjustment nut 68. The arrangement is such that when the hinge arm mounting nut and bolt 60, 58 are loosened, the rotational position of the adjustment member 24 relative to the mounting member 22 can be adjusted by rotating the adjustment bolt 74 using the hexagonal head. This causes the captive adjustment nut 68 to move along (or at least relative to) the length of the bolt shaft 78, rotating the adjustment member about the adjustment pivot pin 42 and the first axis X. The limits of adjustment are determined by the length of the elongate slots 56 in the first side walls. An aperture 86 is provided in the upper wall 40 of the adjustment member 24 through which the shaft 74 of the adjustment bolt can project if required.

It will be appreciated that the adjustment bolt 74 need not have hexagonal head engagable by a spanner or socket or the like but could be provided with a head having any suitable formation engageable by a tool to rotate the bolt, such as a hexagonal socket engageable by a hexagonal key or a slot engagable by a screwdriver. Accordingly, the term "adjustment bolt" should be understood broadly as encompassing any member having an elongate shaft with an external thread for engagement with the adjustment nut and a suitable drive formation engageable by a tool or by hand to rotate the shaft. Similarly, the term "adjustment nut" should be understood broadly as encompassing any member having a threaded bore with which the adjustment bolt 74 engages.

In use, the mounting units 20 for the two hinges are secured to the parcel shelf 16, the hinge arms 18 are mounted to the mounting units at their second ends 18B and a boot lid is secured to the first ends 18A of the hinge arms. The precise sequence in which the various parts are attached can be varied. The boot lid is closed and checked to see if adjustment is required. Where adjustment in the vertical direction is necessary, the boot lid is opened and, if they have previously been tightened, the nut and bolt 58, 60 of each hinge assembly is slackened off. Adjustment can then be carried out by rotating the adjustment bolt 70 in the required direction. Fitment of the boot lid is re-checked and the procedure repeated until a satisfactory result is achieved. Once the boot lid is correctly adjusted, the nut and bolt 58, 60 of each hinge assembly are tightened to lock the pivotal position of the adjustment member 24 relative to the mounting member 22. In some cases, it may be possible to access the mounting units 20 to effect adjustment from within the vehicle so that the boot lid can be adjusted without it being opened. It will be noted that when the nut 60 and bolt 58 are loosened, the adjustment member 24 holds the hinge arm 18 in position relative to the mounting member 22 so that the starting position is not lost. The hinge arm 18 is only moved relative to the mounting member 22 when the adjustment member 24 is pivoted using the adjustment bolt 70.

Figure 4:
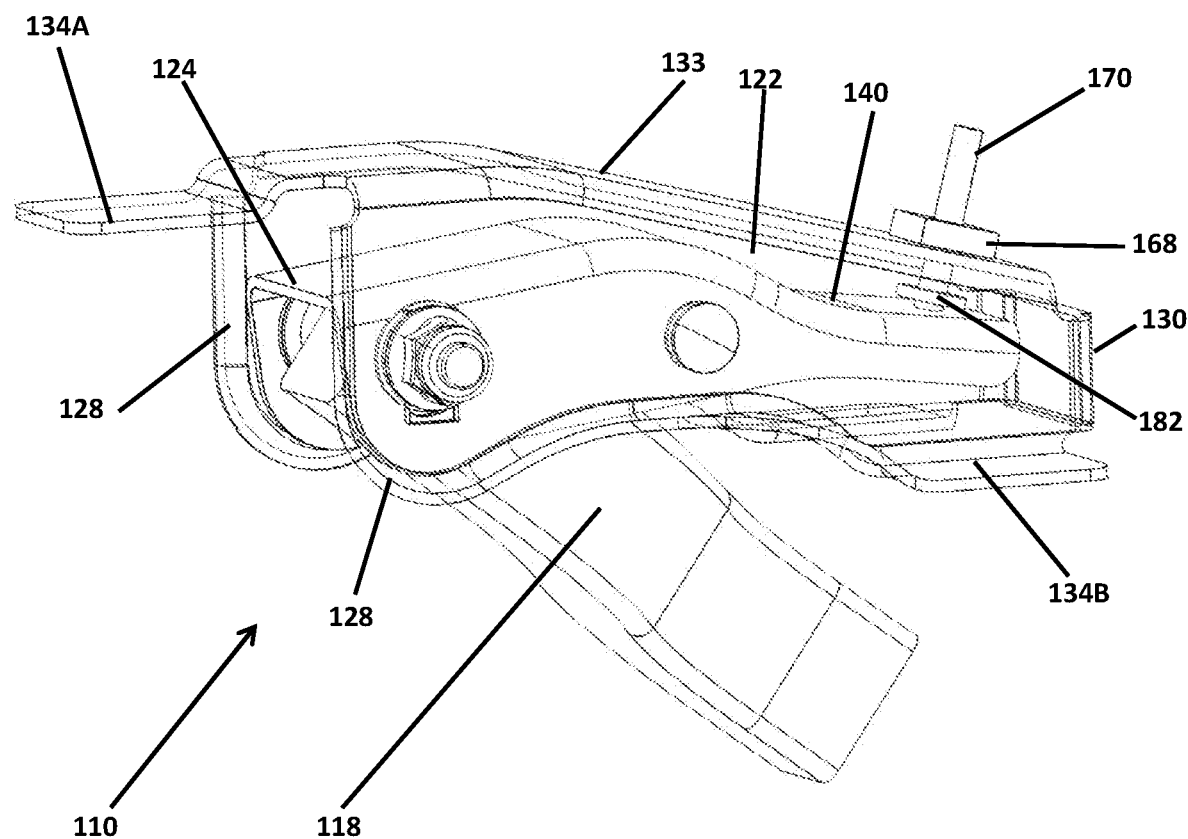
FIG. 4 is a view similar to that of FIG. 3 but taken from a different angle and illustrating a second embodiment of an adjustable hinge assembly in accordance with the invention.

FIG. 4 illustrates an alternative embodiment of a hinge assembly 110 in accordance with the invention. In the following description, features of the second embodiment of the hinge assembly 110 which are the same as those of the first embodiment 10 or which serve the same general function will be given the same reference number but increased by 100.

The hinge assembly 110 in accordance with the second embodiment is substantially the same as that of the hinge assembly 10 of the first embodiment described above, to which the reader should refer for details. Accordingly, only those aspects of the second hinge assembly 110 which differ from the first 10 will be described.

In the hinge assembly 110, the construction of the mounting member 122 differs from that 22 of the first embodiment. The first side walls 128 of the mounting member 122 are interconnected at a forward end by a first vertical wall member 130 and by means of a horizontal upper wall 133. The mounting member 122 has three mounting flanges, a first flange 134A extending rearwardly from the rearward end of the horizontal upper wall 133 and a pair of lateral flanges 134B, each extending laterally outwardly from the lower edge of a respective one of the first sidewalls in a forward region of the mounting member 122. Although not shown, each flange 134A, 134B may be provided with an aperture through which a fastening can be inserted to attach the mounting member 122 to suitable mounting surfaces on the underside of the parcel shelf of a vehicle body. Each flange 134A, 134B extends in a plane substantially perpendicular to the planes of the first side walls 128 but in this case the rearward flange 134A is in a different plane to that of the forward flanges 134B.

The other major difference between the hinge assembly 110 and the first hinge assembly 10 is in the configuration of the adjusting mechanism 126. In the hinge assembly 110, the adjustment bolt 170 is mounted to the adjustment member 124 whilst the adjustment nut 168 is fixed to the mounting member 122. The adjustment bolt 170 is substantially the same as that described above in relation to the first embodiment but is mounted in a slot formed in the forward end of the upper wall 140 of the adjustment member, with the bolt flanges (only one of which 182 can be seen) located either side of the wall 140 so that the bolt can be rotated in the slot but is longitudinally fixed. The adjustment nut 168 is mounted to the upper wall 133 of the mounting member. The upper wall 133 has an opening through which a flange on the nut is inserted and clinched to hold the nut rotationally fast. The adjustment nut 168 has a threaded bore in-line with the opening so that the shaft of the bolt 170 can pass through the opening to engage in the threaded bore in the nut 168. With this arrangement, there is no requirement to reduce the width of the adjustment member at the forward end.

The hinge assembly 110 is otherwise constructed, assembled and adjusted substantially as described above in relation to the hinge assembly 10 previously described.

The above embodiments are described by way of example only. Many variations are possible without departing from the scope of the invention as defined in the appended claims. It will be appreciated, for example, that the shapes of the mounting member 22, 122 and the adjustment member 24, 124 can be varied from those shown, and that alternative arrangements for adjustably pivoting the adjustment member relative to the mounting member can be adopted.

The invention claimed is:

1. An adjustable hinge assembly comprising a mounting unit including a mounting member, an adjustment member connected to the mounting member for pivotal movement relative to the mounting member about a first axis, and an adjusting mechanism operative to selectively adjust the pivotal position of the adjustment member relative to the mounting member about the first axis, the assembly also including a hinge arm connected to the adjustment member for pivotal movement relative to the adjustment member about a second axis parallel to but spaced from the first axis and a locking mechanism for releasably locking the adjustment member relative to the mounting assembly,
   wherein the mounting member comprises a pair of spaced opposed first side walls, the adjustment member being located between the first side walls and having a pair of spaced opposed second side walls, the hinge arm having a pivot section received between the second side walls, the hinge arm being connected to the adjustment member by means of a hinge arm pivot pin which passes through a bore in the pivot section of the hinge arm and aligned apertures in the second side walls, and
   wherein the hinge arm pivot pin also passes through an elongate opening in each of the first side walls.

2. An adjustable hinge assembly as claimed in claim 1, wherein the locking mechanism comprises means associated with the hinge arm pivot pin operative to selectively clamp each first side wall into contact with an adjacent second side wall and to clamp the second side walls to the pivot section of the hinge arm.

3. An adjustable hinge assembly as claimed in claim 2, wherein the hinge arm pin comprises a threaded bolt, a threaded fastener being mounted to one end of the bolt.

4. An adjustable hinge assembly as claimed in claim 1, wherein the pivot section of the hinge arm comprises a pivot bearing located in a bore in the hinge arm, the bearing defining a central bore through which the pivot pin passes.

5. An adjustable hinge assembly as claimed in claim 4, wherein the bearing has an annular main body region and a flange projecting radially outward from the outer diameter of the main body at either end, each flange overlying a respective side face of the hinge arm.

6. A adjustable hinge assembly as claimed in claim 5, wherein the hinge arm pivot pin also passes through an elongate opening in each of the first side walls, the locking mechanism comprises means associated with the hinge arm pivot pin operative to selectively clamp each first side wall into contact with an adjacent second side wall and to clamp the second side walls to the pivot section of the hinge arm, and wherein the locking mechanism is operative to clamp the second side walls into contact with the flanges of the pivot bearing.

7. An adjustable hinge assembly as claimed in claim 1, wherein the adjustment member is pivotally connected to the mounting member by means of an adjustment pivot pin which passes through aligned holes in the first side walls and through the adjustment member.

8. An adjustable hinge assembly as claimed in claim 7, wherein the adjustment pivot pin passes through aligned holes in the second side walls of the adjustment member.

9. An adjustable hinge assembly as claimed in claim 1, wherein the adjusting mechanism comprises a nut captivity mounted to one of the adjustment member and the mounting member and a threaded bolt rotatably mounted to the other of the adjustment member and the mounting member, the bolt being in threaded engagement with the nut such that rotation of the bolt causes the nut to move axially along the length of the bolt and the adjusting mechanism to pivot relative to the mounting member about the first axis.

10. An adjustable hinge assembly as claimed in claim 9, wherein the nut comprises a cylindrical member having a threaded bore extending through it in a direction perpendicular to its longitudinal axis, the cylindrical member being mounted to the adjustment member for rotation about its longitudinal axis, which longitudinal axis is aligned parallel to but spaced from the first and second axes.

11. An adjustable hinge assembly as claimed in claim 1, wherein the mounting member has at least one mounting flange for securing the mounting member to a surface.

12. An adjustable hinge assembly as claimed in claim 11, wherein the at least one mounting flange extends in a plane generally perpendicular to the first side walls.

13. An adjustable hinge assembly as claimed in claim 11, wherein pivotal movement of the adjustment member about the first axis is operative to vary the distance between the second axis and the at least one mounting flange.

14. An adjustable hinge assembly as claimed in claim 1, wherein the hinge assembly is configured to mount a vehicle boot lid to the body of a vehicle.

15. A motor vehicle having a body and a lid mounted to the body by means of at least one adjustable hinge assembly as claimed in claim 1.

16. A motor vehicle as claimed in claim 15, wherein the lid is a boot lid.

17. A motor vehicle as claimed in claim 15, wherein the body has a parcel shelf and the lid is mounted to the parcel shelf by means of said at least one adjustable hinge assembly.

18. A motor vehicle as claimed in claim 17, wherein the adjusting mechanism is accessible from the below the parcel shelf.

19. A motor vehicle as claimed in claim 15, wherein adjustment of the at least one hinge assembly results in adjustment of the lid generally in a vertical direction relative to the vehicle body.

* * * * *